United States Patent [19]

Ishizu et al.

[11] Patent Number: 5,398,100
[45] Date of Patent: Mar. 14, 1995

[54] IMAGE RECORDING APPARATUS OPERABLE WITH A VERTICAL SCAN SYNCHRONIZATION SIGNAL

[75] Inventors: Masanori Ishizu, Yokohama; Toshihiko Inuyama, Fujisawa; Takeji Gima, Toride; Hiroshi Hashimoto, Tokyo; Hiromichi Yamanaka, Kawasaki; Soya Endo, Tokyo; Toshiyuki Itoh, Oyama; Hitoshi Machino, Tokyo; Tomohiro Nakamori, Ichikawa, all of Japan

[73] Assignee: Canon Kabushiki Kaisha, Tokyo, Japan

[21] Appl. No.: 83,442

[22] Filed: Jun. 29, 1993

[30] Foreign Application Priority Data

Nov. 12, 1992 [JP] Japan .................................. 4-302248
Jun. 8, 1993 [JP] Japan .................................. 5-137617

[51] Int. Cl.$^6$ ........................................... G03G 21/00
[52] U.S. Cl. ..................................... 355/208; 355/200; 355/204; 358/296; 358/409
[58] Field of Search ................... 346/153.1, 154, 160; 358/296, 401, 409, 443; 355/200, 202, 204, 208, 209

[56] References Cited

U.S. PATENT DOCUMENTS

| | | |
|---|---|---|
| 5,047,957 | 9/1991 | Ikenoue . |
| 5,093,904 | 3/1992 | Sasaki et al. . |
| 5,140,675 | 8/1992 | Okada .............................. 346/154 X |
| 5,142,304 | 8/1992 | Sato et al. ....................... 358/296 X |
| 5,162,917 | 11/1992 | Sugishima .......................... 358/296 |

FOREIGN PATENT DOCUMENTS

| | | |
|---|---|---|
| 58-121445 | 12/1983 | Japan . |
| 59-223066 | 7/1984 | Japan . |

*Primary Examiner*—A. T. Grimley
*Assistant Examiner*—Sandra L. Brasé
*Attorney, Agent, or Firm*—Fitzpatrick, Cella, Harper & Scinto

[57] ABSTRACT

An image recording apparatus operated in synchronism with a vertical synchronization signal from an external device comprises a unit for sending out to the external device a signal indicating a status to accept the vertical synchronization signal, and switching device for switching between a plurality of operation modes related to an elapsed time from the send-out of the signal by the signal sending unit.

25 Claims, 16 Drawing Sheets

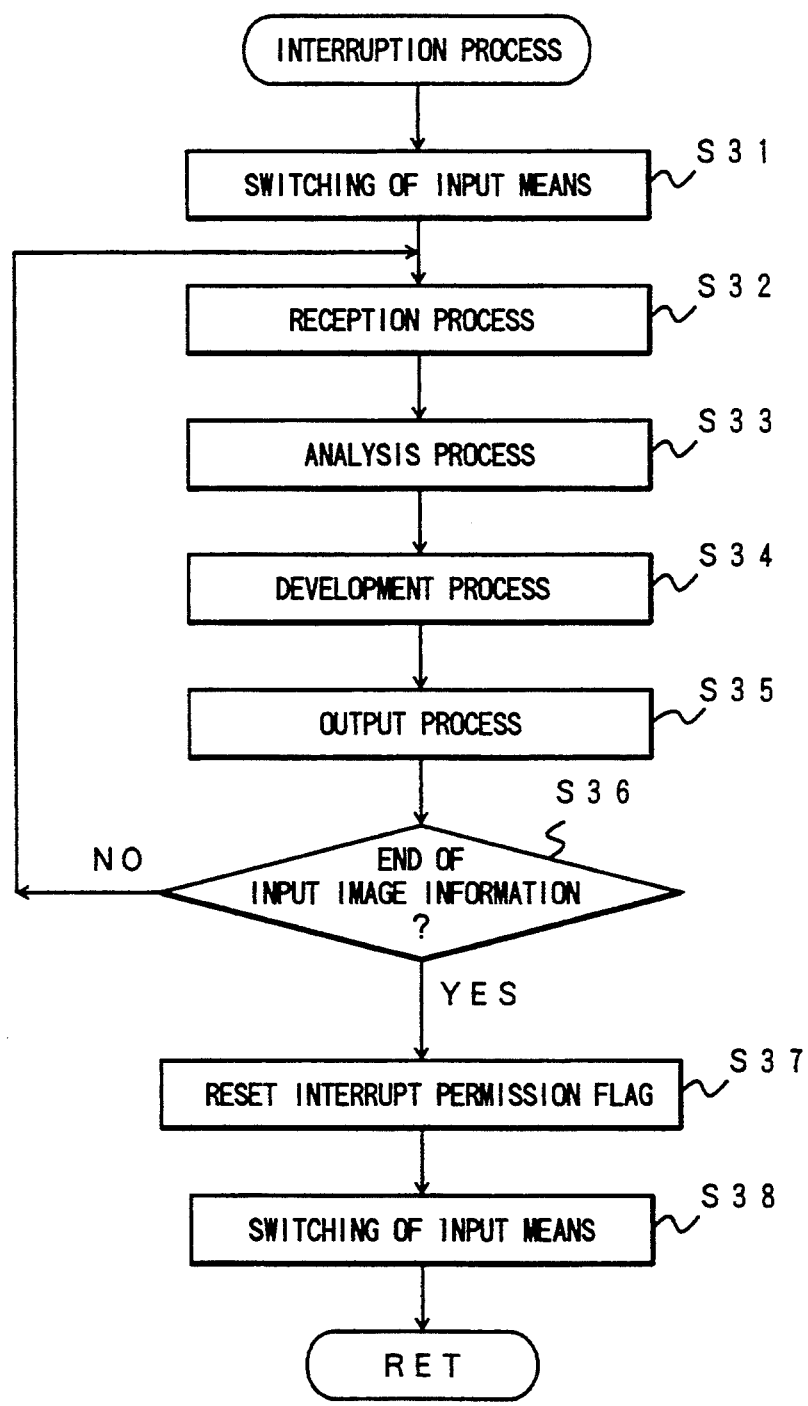

IMAGE RECORDING APPARATUS OPERABLE WITH A VERTICAL SCAN SYNCHRONIZATION SIGNAL

BACKGROUND OF THE INVENTION

1. Field of the Invention

The present invention relates to an image recording apparatus which operates in synchronism with a vertical scan synchronization signal (hereinafter a VSYNC signal) from an image signal generator to output a vertical scan signal synchronization signal request signal (hereinafter a VSREQ signal) indicating that the VSYNC signal is acceptable.

2. Related Background Art

In a laser beam printer, a start of print signal (hereinafter a PRNT signal) is outputted to a printer engine (hereinafter an image recording apparatus) from an apparatus (hereinafter a controller) for outputting an image signal in synchronism with a so-called BD signal, and the image recording apparatus starts a print preparation operation in response thereto, and when it is ready to receive a VSYNC signal, it renders the VSREQ signal true to the controller. (A status in which the VSREQ signal is true, that is, when the VSYNC signal is acceptable is called a print enable state.)

When the controller then renders the VSYNC signal true, a print operation is started.

In some image recording apparatuses, the VSYNC signal from the controller is permanently monitored after the VSREQ signal is rendered true, and in other image recording apparatuses, an error is detected if the VSYNC signal is not received with in a predetermined period after the VSREQ signal bas been rendered true.

However, in the prior art, different controllers are required depending on whether the image recording apparatus to be connected is the former type or the latter type. It is not possible to connect the image recording apparatus of the latter type to the controller which is to be connected to the image recording apparatus of the former type.

Accordingly, such recording apparatus lacks the general purpose usability and if it is misconnected, it will lead to malfunction or trouble.

SUMMARY OF THE INVENTION

It is an object of the present invention to provide an image recording apparatus which solves the technical problems described above, has general purpose usability and solves the problems of trouble due to mishandling.

In accordance with the present invention, a switch is provided in the image recording apparatus so that it is compatible to two modes, a mode in which the print enable state is maintained even after a predetermined time has elapsed without receiving the VSYNC signal from the controller since the VSREQ signal was rendered true, and a mode in which the print enable state is released if the VSYNC signal is not received in the predetermind time.

It is another object of the present invention to provide an image recording apparatus for developing code data from a host computer into bit map data which permits selective switching between the above two modes in accordance with a time required for the development process.

Other objects, advantages and effects of the present invention will be apparent from the accompanying drawings, the detailed description of the preferred embodiments and the appended claims.

BRIEF DESCRIPTION OF THE DRAWINGS

FIG. 13 shows a flow chart of detail of a step S18 of FIG. 11, FIGS. 14A to 14D show hand shake of data between the control mechanism of FIG. 4 and the printer.

DETAILED DESCRIPTION OF THE PREFERRED EMBODIMENTS

The preferred embodiments of the present invention are now described with reference to the drawings.

Embodiment 1

Figure 1:
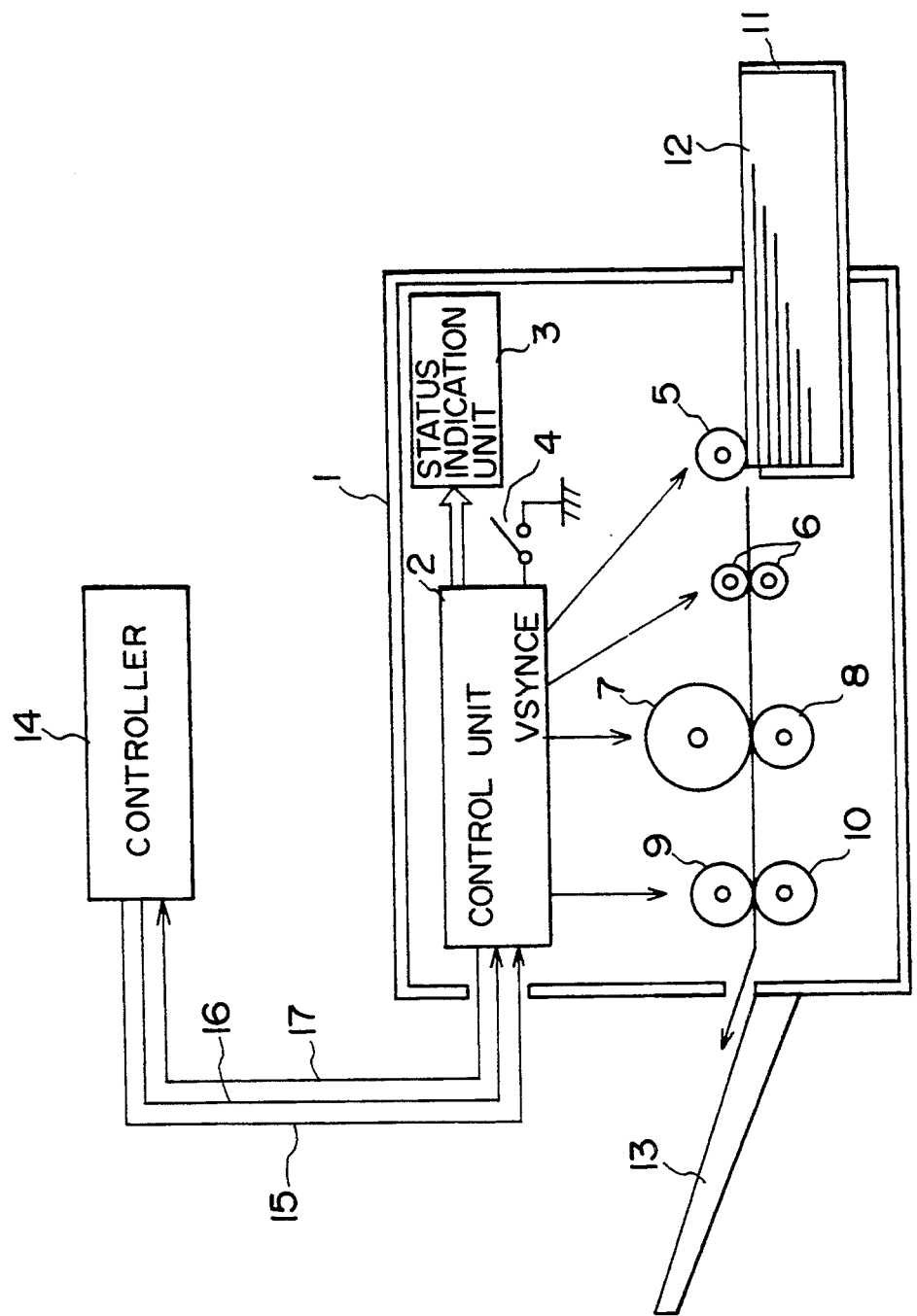
FIG. 1 shows a schematic view of an image recording apparatus in accordance with a first embodiment of the present invention.

FIG. 1 best shows a feature of the present invention. Numeral 1 denotes an image recording apparatus, numeral 2 denotes a control unit of the image recording apparatus, numeral 3 denotes a status indication unit, numeral 4 denotes a switch, numeral 5 denotes a sheet feed roller, numeral 6 denotes a registration roller, numeral 7 denotes a photo-sensitive drum, numeral 8 denotes a transfer roller, numeral 9 denotes a fixing roller, numeral 10 denotes a pressure roller, numeral 11 denotes a cassette, numeral 12 denotes a stack of cut sheets, numeral 13 denotes a sheet eject tray, numeral 14 denotes a controller, numeral 15 denotes a PRNT signal line, numeral 16 denotes a VSYNC signal line, and numeral 17 denotes a VSREQ signal line.

When the control unit 2 in the image recording apparatus 1 receives the PRNT signal 15 from the controller 14, it controls the printing, that is, pre-rotation of the photo-sensitive drum 7 to stabilize the formation of an image and the rise of a temperature of the fixing roller 9 to a print temperature. The sheet feed roller 5 is rotated to feed a cut sheet 12 to a position of the registration roller 6. Then, the control unit 2 renders the VSREQ signal 17 true for the controller 14, and when it receives the VSYNC signal 16 from the controller 14, it drives the registration roller 6 to start the feeding of the cut sheet 12.

An image is formed on the cut sheet 12 by the photosensitive drum 7 and the transfer roller 8, and it is fixed by the fixing roller 9 and the pressure roller 10 and ejected to the sheet eject tray 13.

Figure 2:
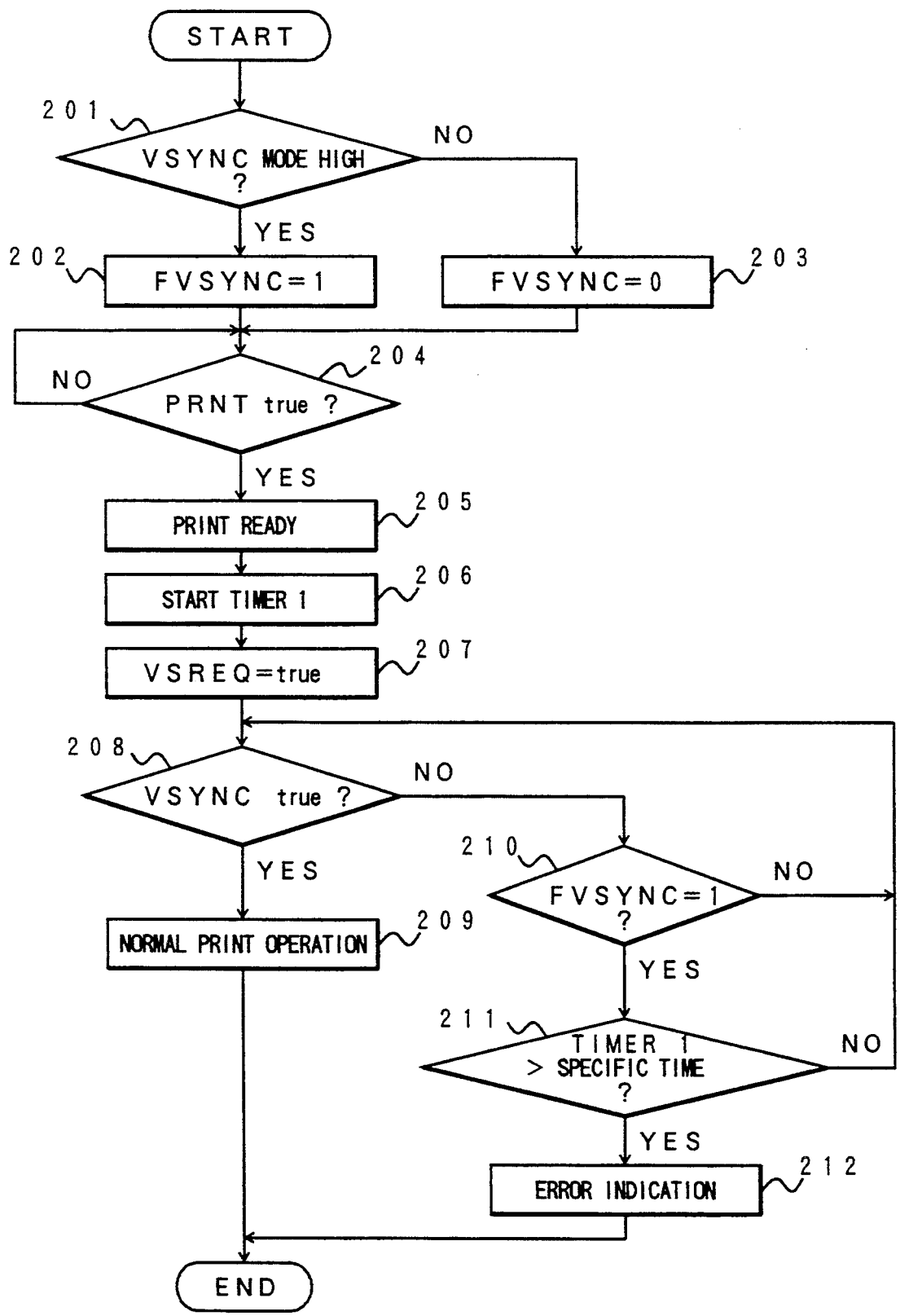
FIG. 2 shows a flow chart of a control procedure in the first embodiment.

Referring to a flow chart of FIG. 2, an operation when the mode switch 4 is positioned to the VSYNC mode (VSYNCE) or other mode is explained.

In a step 201, whether the mode switch 4 is in the VSYNC mode or not is checked. If the signal read is HIGH, it means that the mode switch is in the VSYNC mode (VSYNCE) and a FVSYNC flag is set to "1" in a step 202. If the signal read is LOW, the FVSYNC flag is set to "0" in a step 203.

Then, in a step 204, a PRNT signal 15 sent from the controller 14 is monitored. When the PRNT signal 15 is rendered true, the process proceeds to a step 205 to prepare for the printing. When the preparation is ready, a TIMER1 is started in a step 206 and the VSREQ 17 is rendered true in a step 207. In a step 208, the VSYNC signal from the controller 14 is monitored (print enable state), and when the VSYNC signal 16 is received, a normal print operation is conducted in a step 209 and the process terminates.

On the other hand, if the VSYNC signal 16 is not applied in the step 208, the FVSYNC flag is checked in a step 210, and if the FVSYNC flag is "0", the process returns to the step 208 and continuously monitors the VSYNC signal 16. If the FVSYNC flag is "1", the TIMER1 is checked in a step 211, If the TIMER1 is within a specific (predetermined) time, the process returns to the step 208. If the TIMER1 exceeds the predetermined timer an error is indicated on the status display unit 3 in a step 212 and the process is terminated. Thus, the print enable status is released.

Figure 3:
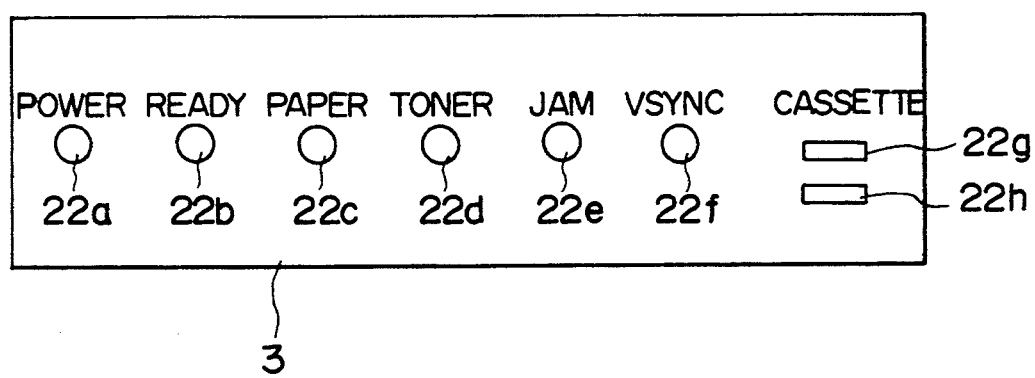
FIG. 3 shows a detail of a status display unit.

FIG. 3 shows a detail of the status display unit 3. Numeral 22a denotes a power LED (light emitting diode) for indicating the power-on or power-off of the apparatus, numeral 22b denotes a ready LED indicating a record ready status, numeral 22c denotes a paper LED which is lit when the cassette 11 containing the cut sheets 12 is not correctly set in a designated sheet feed port, numeral 22d denotes a toner LED which is lit when remaining toner reaches a small amount, numeral 22e denotes a jam LED which is lit when a jam occurs, numeral 22f denotes a VSYNC LED for indicating the VSYNC mode status, and numerals 22g and 22h denote LEDs for indicating the designated sheet feed port.

When the VSYNC mode (VSYNCE) is HIGH after the detection of the VSYNC mode in the step 201, the FVSYNC flag is set to "1" in the step 202 to turn on the VSYNC LED 22f. If the VSYNC mode is LOW, the FVSYNC flag is set to "0" in the step 203 to turn off the VSYNC LED 22f.

Embodiment 2

Figure 4:
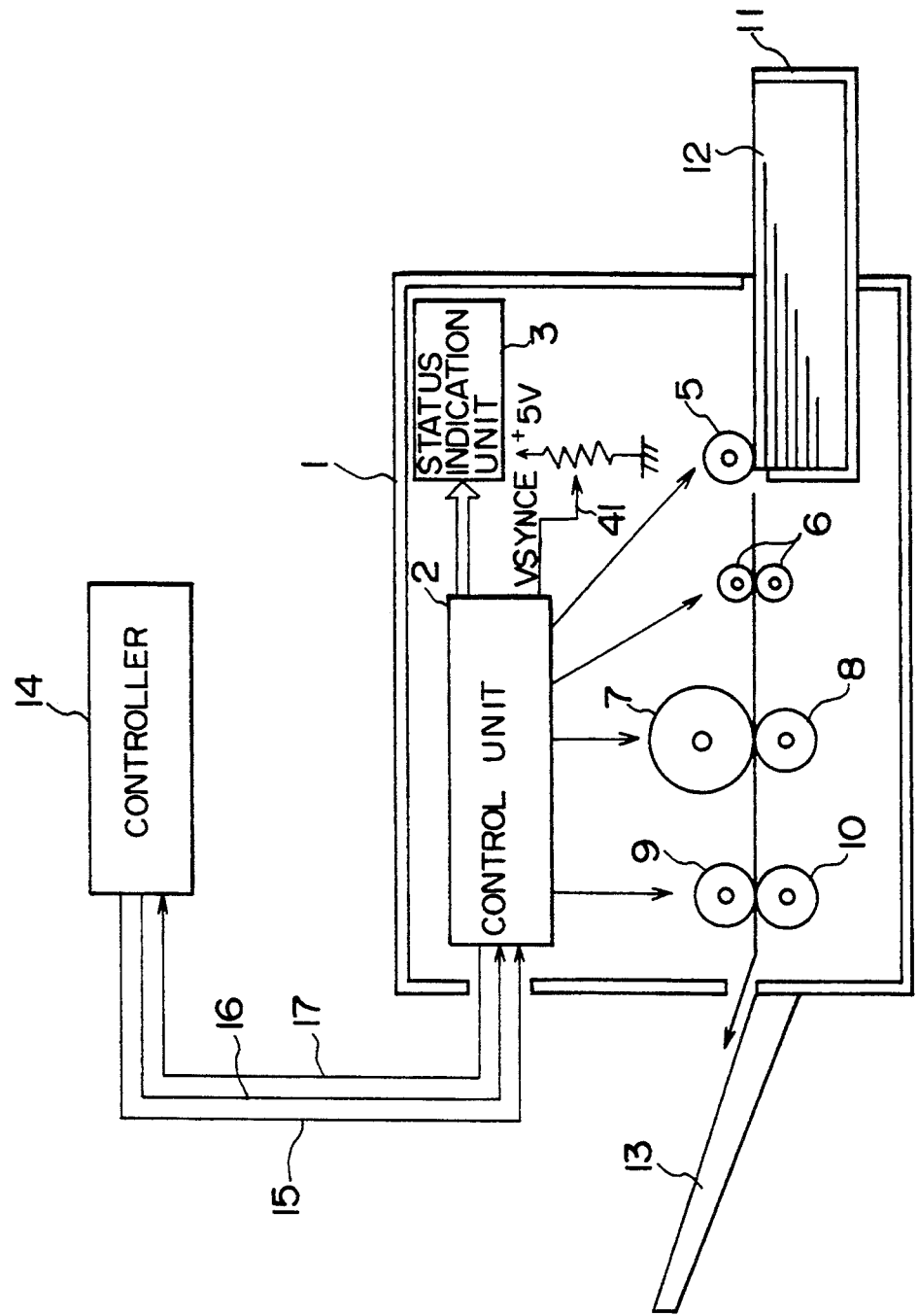
FIG. 4 shows a schematic view of an image recording apparatus in accordance with a second embodiment of the present invention.

In the above embodiment, the VSYNC mode switch is used. Alternatively, an analog value by using a potentiometer $V_R$ 41 may be used as shown in FIG. 4.

Figure 5:
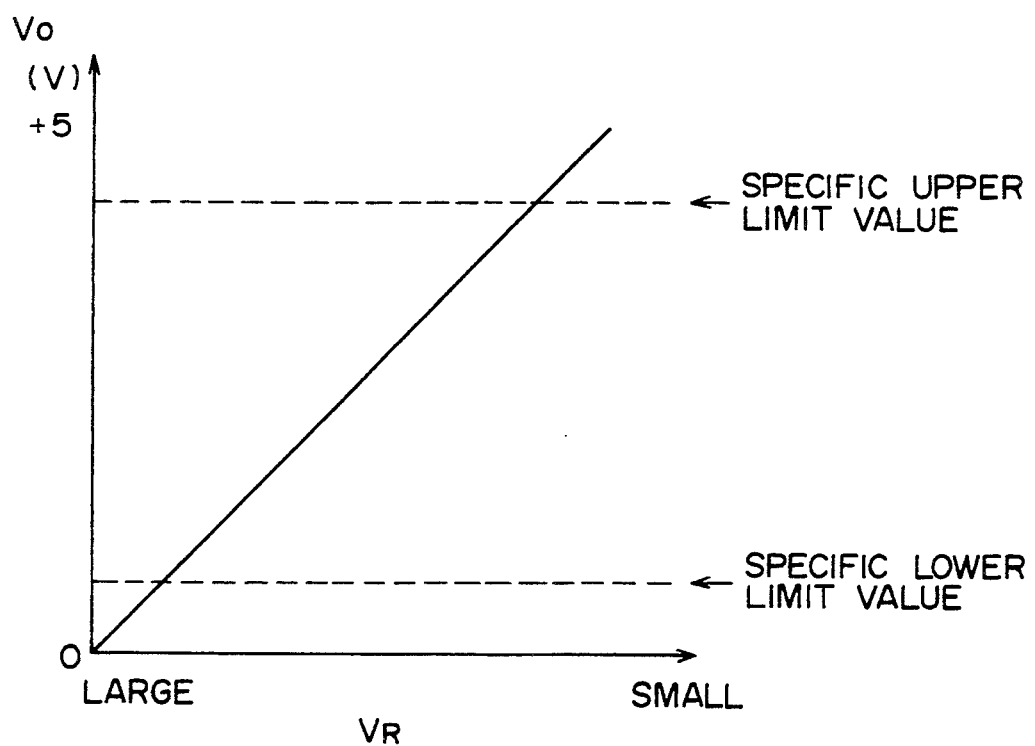
FIG. 5 shows a relationship between a potentiometer and a voltage of VSYNCE.

By manipulating the potentiometer $V_R$ 41, the analog value $V_0$ of the VSYNCE may be varied from 0 V to 5 V as shown in FIG. 5. A specific lower limit and a specific upper limit of the voltage are set, and when the analog value $V_0$ of the VSYNCE is smaller than the specific lower limit, a specific time of the timer is set to a predetermined time A, and when the analog value $V_0$ is larger than the specific upper limit, the VSYNC is permanently monitored. When the analog value $V_0$ is between the specific lower limit and the specific upper limit, a predetermined time B longer than the time A is set as the specific time. The predetermined time at the specific lower limit is set to C and the predetermined time at the specific upper limit is set to D, and the predetermined time is variable therebetween in accordance with the value $V_0$.

Figure 6:
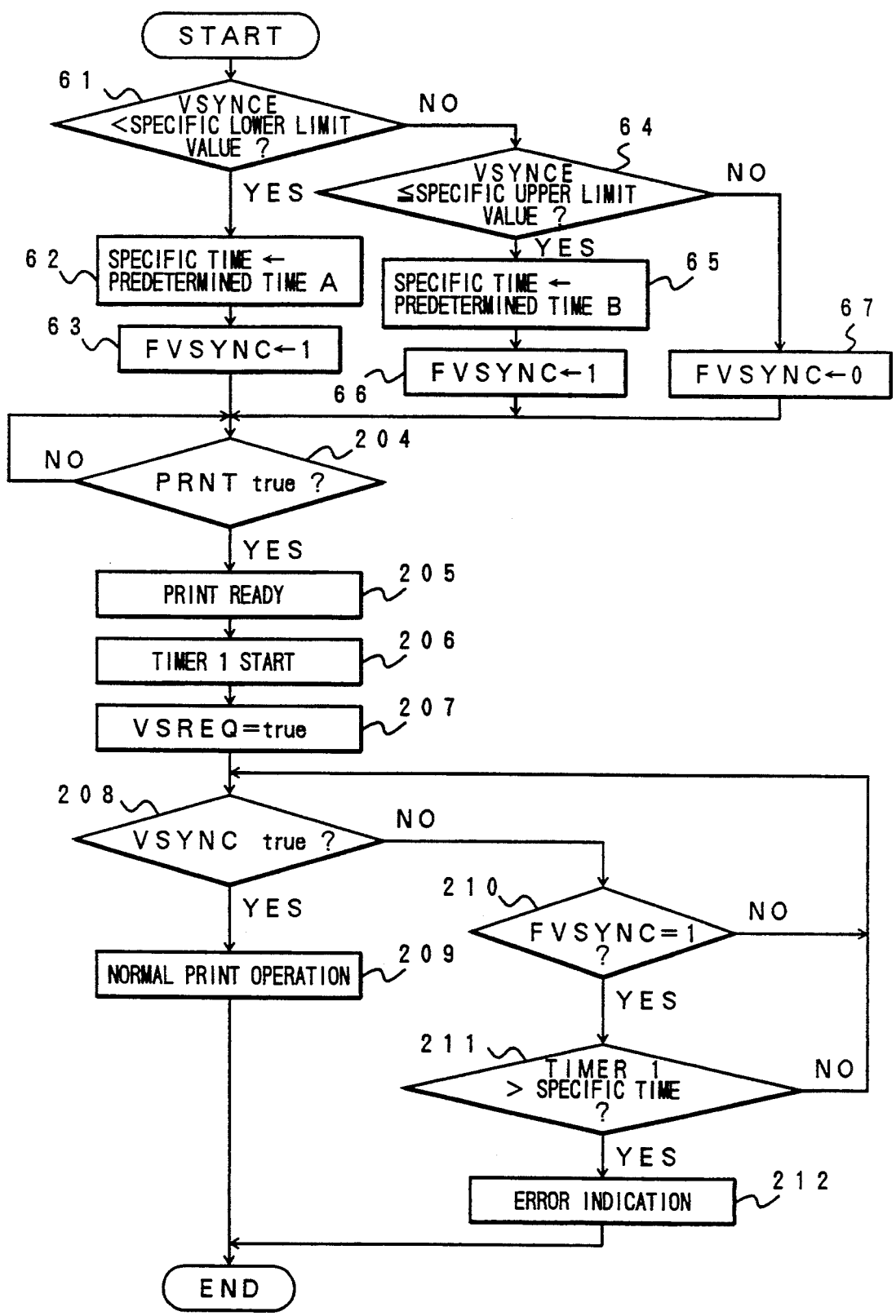
FIG. 6 shows a flow chart of a control procedure in the second embodiment.

A control procedure of the control unit 2 is explained with reference to FIG. 6.

In a step 61, if it is determined that the VSYNCE is lower than the specific lower limit, the process proceeds to a step 62 to set the predetermined time to A, and in a step 63, the FVSYNC flag is set to "1".

In the step 61, if the VSYNCE is higher than the specific lower limit, the process proceeds to a step 64, and if the VSYNCE is lower than the specific upper limit, the process proceeds to a step 65. In the step 65, the preset time is set to B, and in a step 66, the FVSYNC flag is set to "1".

In the step 64, if the VSYNCE is higher than the specific upper limit, the process proceeds to a step 67 to set the FVSYNC flag to "0".

The subsequent process is similar to that of the Embodiment 1 and the process proceeds to the step 204 of FIG. 2. Detailed description thereof is omitted.

Figure 7:
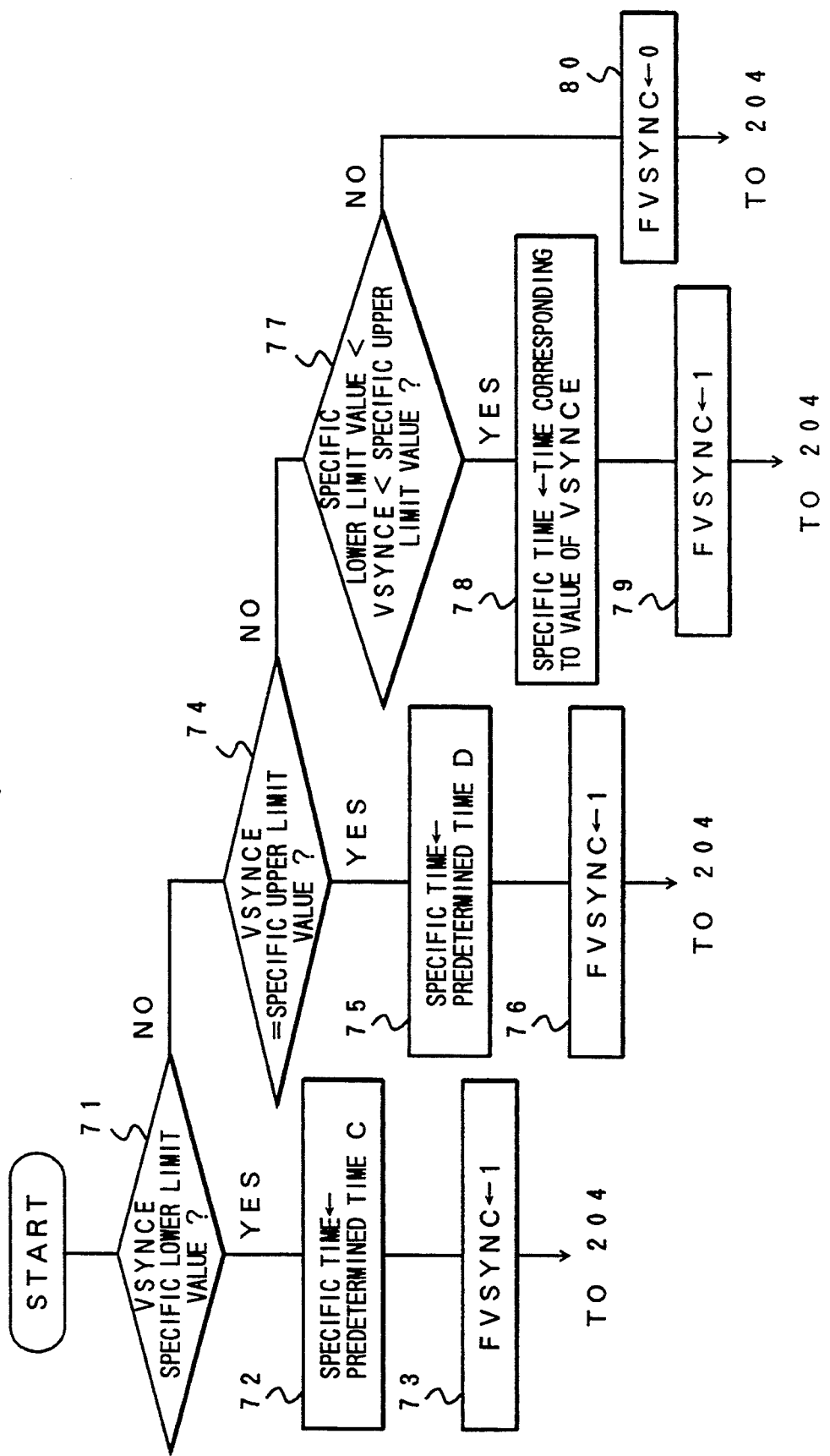
FIG. 7 shows a flow chart of another control procedure in the second embodiment.

The control procedure in the control unit 2 may be modified as shown in FIG. 7. The steps 204 et seq are identical to those of FIG. 2. In a step 71, whether the VSYNCE is equal to the specific lower limit or not is determined, and if it is equal, the predetermined time is set to C in a step 72, and the FVSYNC flag is set to "1" in a step 73. If the decision in the step 71 is not equal, the process proceeds to a step 74 to determine whether the VSYNCE is equal to the specific upper limit or not. If it is equal, the predetermined time is set to D in a step 75 and the FVSYNC flag is set to "1" in a step 76. If it is not equal, whether (the specific lower limit) <VSYNCE< (the specific upper limit) is met or not is determined in a step 74, and if it is met, the predetermined time is set in accordance with the VSYNCE in a step 78, and the FVSYNC flag is set to "1" in a step 79. If the decision in the step 77 is NO, the FVSYNC flag is set to "0" in a step 80.

Embodiment 3

In the Embodiment 1, one of the two modes is selected by the mode switch 4.

An embodiment which selects the mode by using a signal on a video interface which is an interface between the image recording apparatus and the controller is explained with reference to FIGS. 8 and 9.

In a step 301, the FVSYNC flag is set to "0", and in a step 302, the PRNT signal 15 sent from the controller 14 is monitored. If the PRNT signal is false, the VSYNC signal 16 is checked in a step 303. If the VSYNC signal is false, the process returns to the step 302. If the VSYNC signal 16 is true, the FVSYNC flag is set to "1" in a step 304 (at timing A in FIG. 9).

Figure 8:
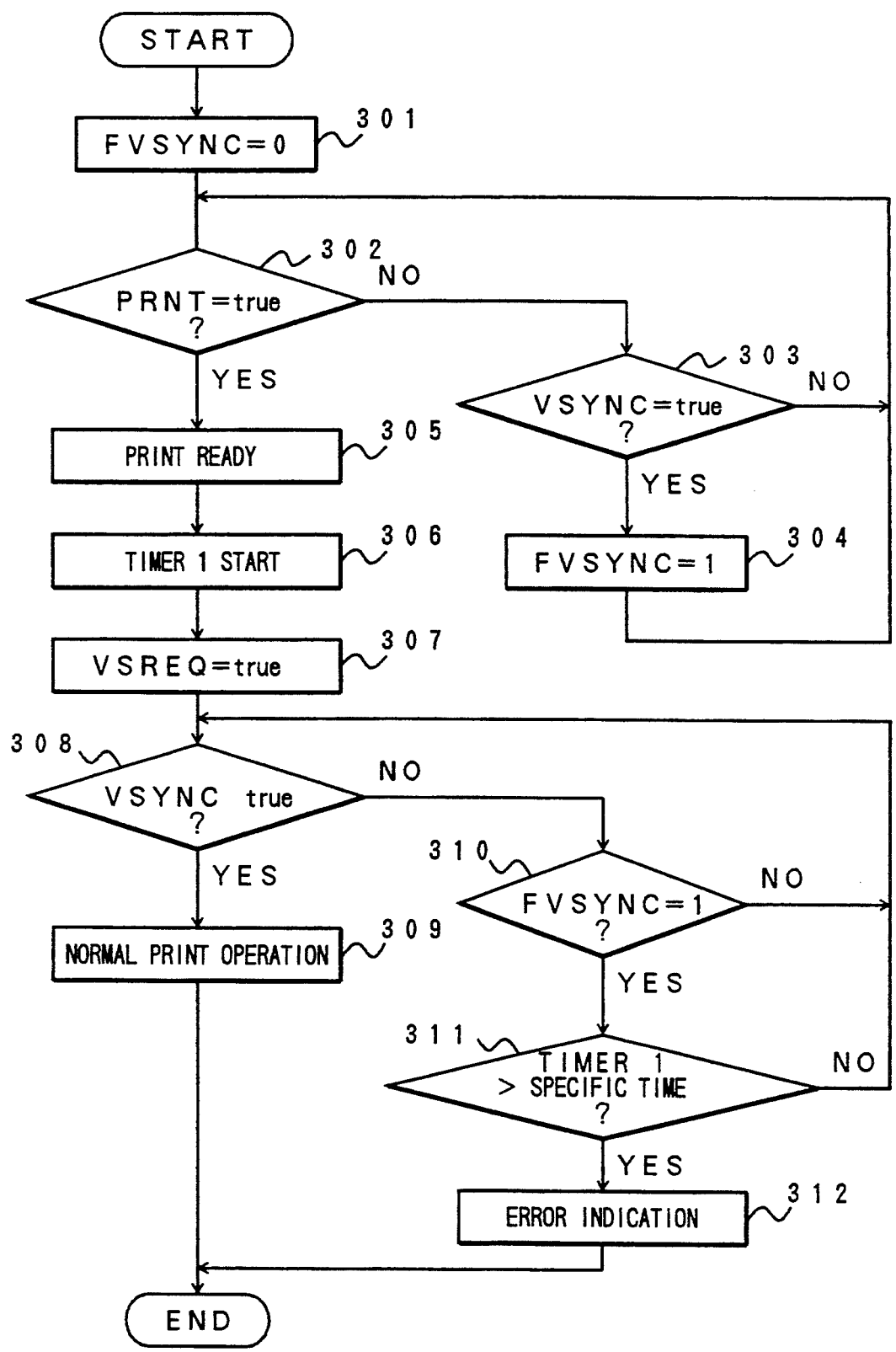
FIG. 8 shows a flow chart of a control procedure in a third embodiment of the present invention.
Figure 9:
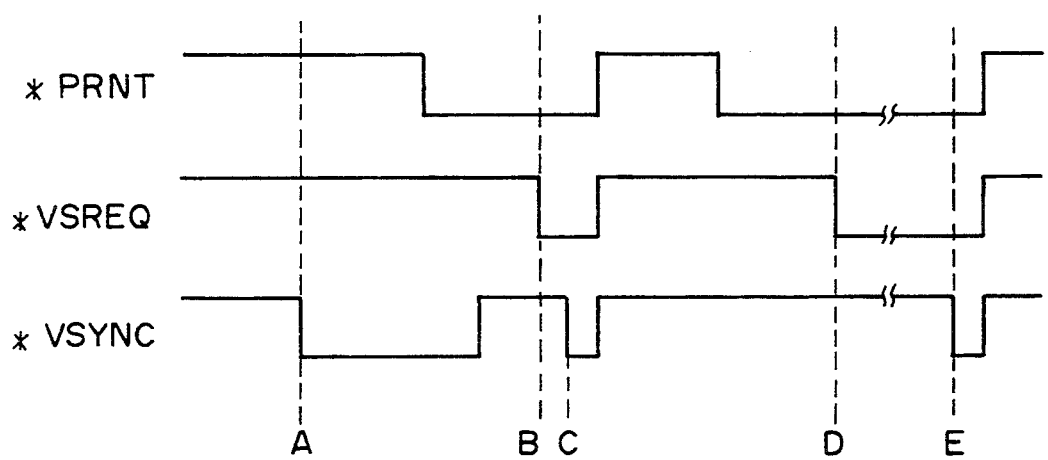
FIG. 9 shows a timing chart of the third embodiment.

The subsequent process is similar to that of the previous embodiments and the steps 305 to 312 of FIG. 8 correspond to the steps 205 to 212 of FIG. 2. Detailed description thereof is omitted.

When the FVSYNC flag is "1", the VSREQ signal 17 is rendered true (at timing B of FIG. 9) and the VSYNC signal 16 sent from the controller 14 is monitored. When the VSYNC signal 16 is rendered true in the predetermined time (at timing C in FIG. 9 in which B-C represents the predetermined time), a normal print operation is conducted. If it exceeds the predetermined time, an error is indicated.

When the FVSYNC flag is "0", the VSREQ signal 17 is rendered true (at timing D in FIG. 9) and the VSYNC signal 16 sent from the controller 14 is permanently monitored. When the VSYNC signal 16 is rendered true (at timing E in FIG. 9), a normal print operation is conducted.

Embodiment 4

While the FVSYNC flag is set by using the signal on the video interface in the above embodiment, it may be switched by a command.

In the Embodiment 1, the mode in which the VSYNC signal is permanently monitored and the mode in which it is monitored for only the preset time are discriminated by using the VSYNC LED 22f on the status indication unit 3. Alternatively, a FVSYNC signal line separately provided on the video interface may be used, or the status of the FVSYNC flag may be sent back to the controller 14 by a command.

An embodiment in which the two modes are switched by a command is explained below.

Configuration of Control System

Figure 10:
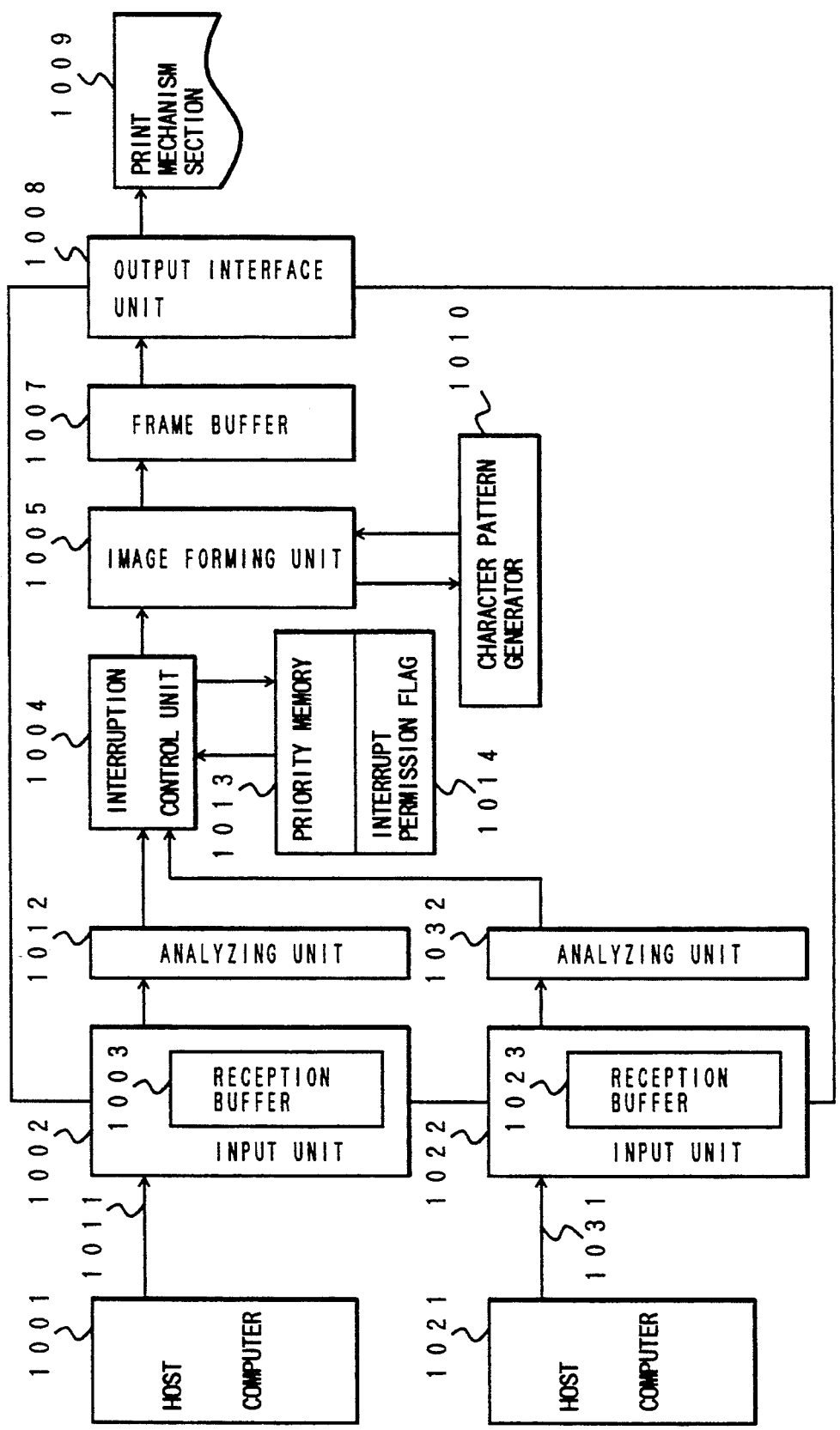
FIG. 10 shows a block diagram of a configuration of a printer in accordance with a fourth embodiment of the present invention.

FIG. 10 shows a block diagram of a configuration of a control system of a laser beam printer which is a fourth embodiment of the present invention.

The control system of the laser beam printer receives information 1011 and 1031 such as character code, external character font, form information and macro registration information sent from host computers 1001 and 1021 which are sources of image information, and controls to print out document information page by page.

Numerals 1002 and 1022 denote input units for receiving information from the host computers 1001 and 1021 numerals 1003 and 1023 denote buffers for temporarily storing the information supplied through the input units 1002 and 1022, numerals 1012 and 1032 denote analyzing units for analyzing the input information, and numeral 1004 denotes an interruption control unit for determining a priority of the input means which has requested interruption based on the priority stored in a priority memory 1013. An interruption permission flag 1014 is used for the control.

Numeral 1010 denotes a character pattern generator which includes a ROM for storing pattern information corresponding to the character codes and a read control circuit therefor, and has a code conversion function of calculating an address of a character pattern corresponding to an input character code.

Numeral 1005 denotes an image data processing unit which forms image data from the input code data.

Numeral 1007 denotes a frame buffer for storing at least one page of pattern image developed into a character pattern corresponding to a print image. Numeral 1008 denotes an output interface unit which generates a video signal corresponding to the pattern information stored in the frame buffer 1007 to execute the interface control to a print unit 1009 which receives the video signal from the output interface 1008 and prints out the image information in accordance with the video signal.

In the printer having the print unit and the control unit described above, the following control is realized.

Control Procedure

Figure 11:
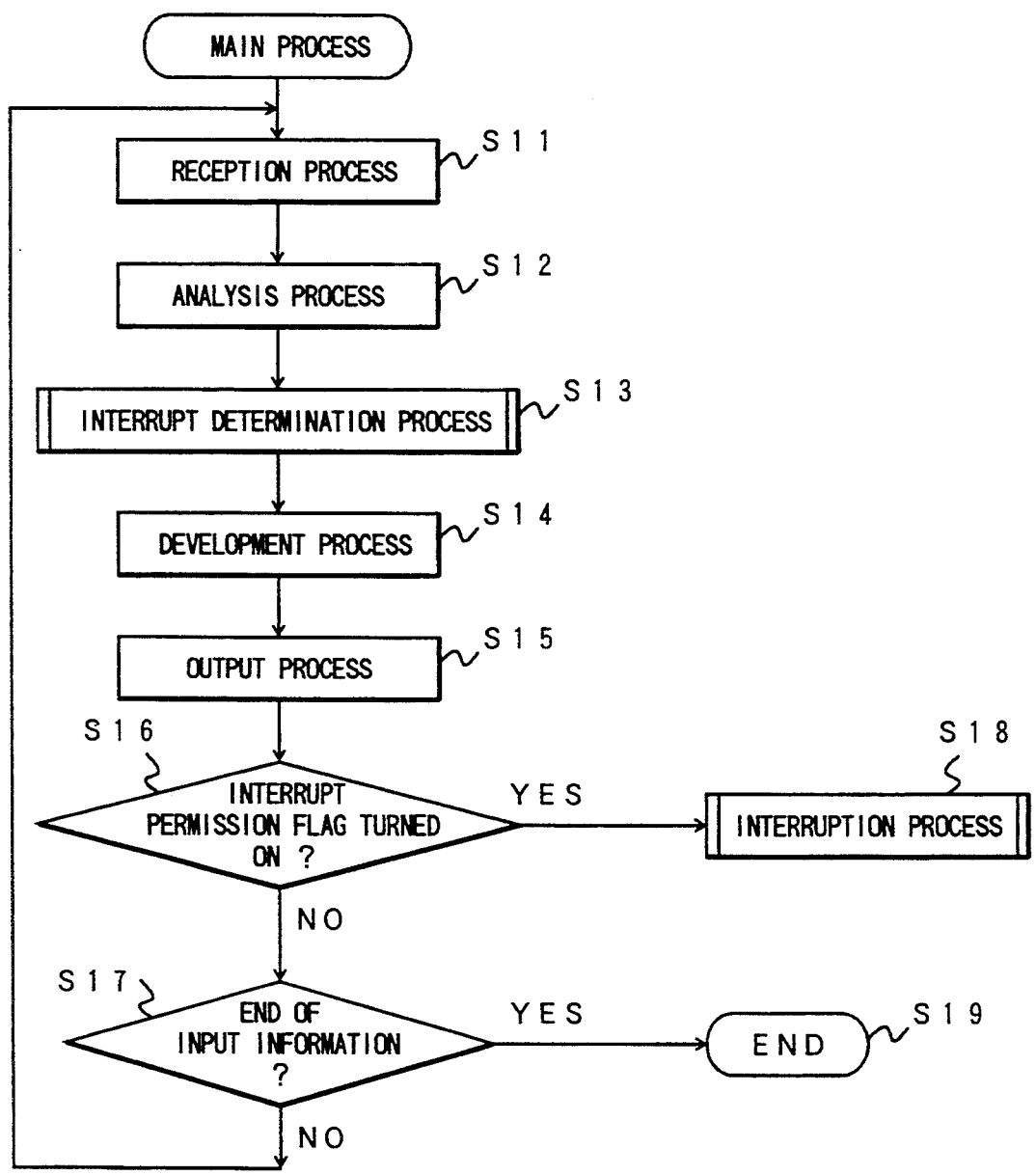
FIG. 11 shows a flow chart of a main process in a control mechanism of the printer of the fourth embodiment.
Figure 12:
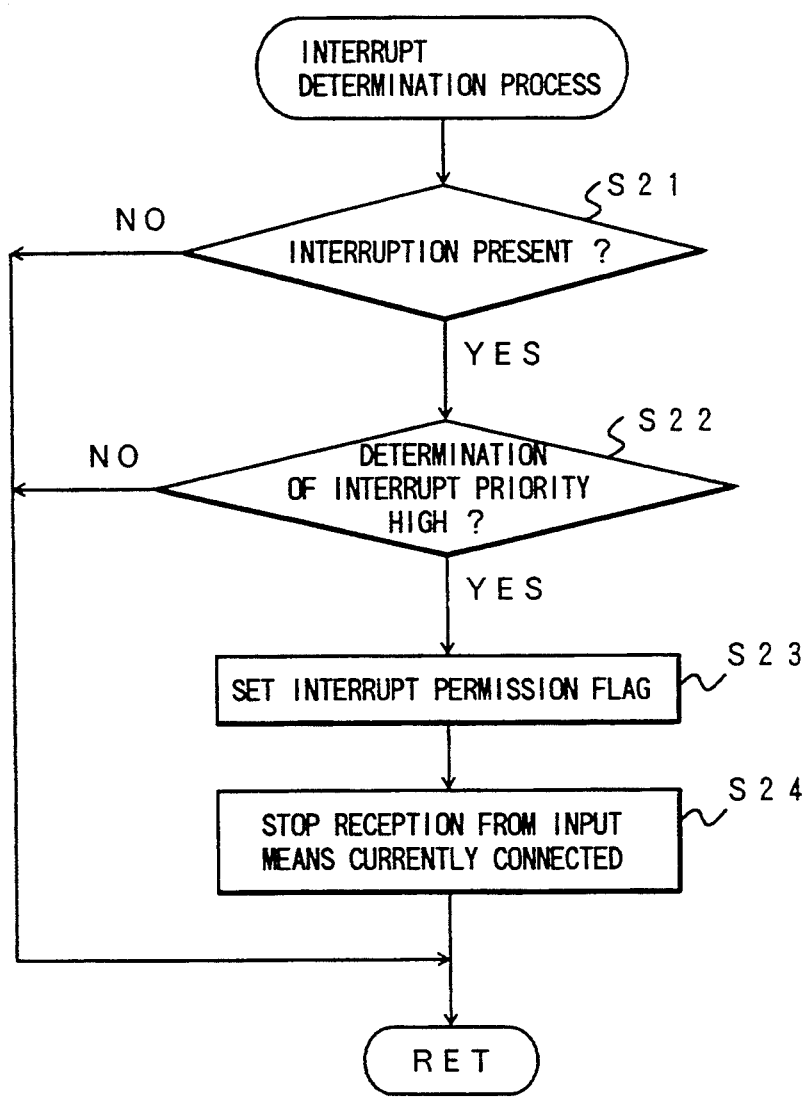
FIG. 12 shows a flow chart of detail of a step S13 shown in FIG. 11.
Figure 14A:
Figure 14B:
Figure 14C:
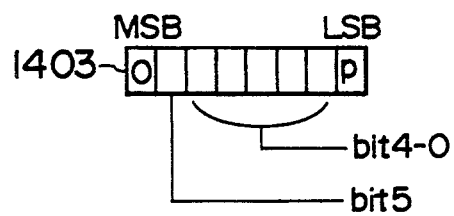
Figure 14D:
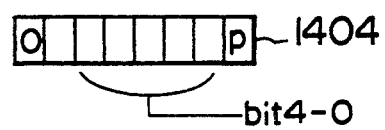

FIGS. 11 to 13 show flow charts of the control procedure executed by the CPU 1005 in the printer of the present embodiment. It is assumed that the input from the input unit 1002 is imparted with a higher priority than that from the input unit 1022 and data is sent from the host computer 1001 in the course of the reception of data from the host computer 1021.

A main process is first explained with reference to FIG. 11.

First, the input unit 1022 receives the image information sent from the host computer 1021 and stores it in the reception buffer 1023 (step S11). The stored image information is analyzed by the analyzing unit 1032 (step S12), and when one page of image information has been analyzed, whether a reception interruption has been requested by other input unit 1002 or not is determined (step S13). In the step S13, if there is a reception interruption request from the input unit 1002 and the interruption is accepted, an interruption permission flag is set. After the determination of the interruption, the input data having received and analyzed is developed into the frame buffer 1007 as the image data of the print image (step S14). The developed image is printed out by the print unit 1009 through the output interface 1008 (step S15). When one page of received data has been processed, whether the interruption has been permitted in the step S13 or not is determined by checking the interruption permission flag (step S16), and if it has not been permitted, whether input data follows through the input unit or not is checked (step S17). If there is no input data, the print process is terminated, and if there is, the process repeats the above steps starting from the reception process.

The interruption determination process is now explained. In the interruption determination process of FIG. 12, whether a reception interruption has been requested by the other input unit (input unit 1002) or is not checked (step S21), and if there is a reception interruption, the priority is checked (step S22). The priority is stored in the priority memory 1013 which is controlled by the interruption control unit 1004. If there is no interruption or there is an interruption but the priority thereof is lower, the decision process is immediately terminated and the pending print process proceeds. If the priority is higher than that of the pending print process and the interrupting data is to be processed first, the interruption permission flag 1014 from the input unit 1002 is set (step S23) and the reception of the image information from the input means currently connected is stopped (step S24). Then, the interruption determination process is terminated and the process returns to the main process.

In the step S16, if the interruption permission flag is "1", the interruption process is executed in the procedure shown in FIG. 13.

In the interruption process, the source of input is switched from the input unit 1022 to the input unit 1002 (step S31), data is received from the new input unit 1002 (step S32), the received data is analyzed by the data analyzing unit 1012 as it is in the step S12 (step S33), and the print image is formed and it is developed into the frame buffer 1007 as it is in the step S14 (step S34).

When the developed data has been printed out (step S35), whether all of the input image data have been processed or not is determined (step S36), and if there is following data, the process is repeated starting from the reception process, and if all data have been received, the interruption permission flag is reset (step S37) and the input is returned to the input unit 1002 which was connected before the interruption (step S38) and the print process by interruption is terminated.

A control process of the process of the specific time from the send-out of the VSREQ signal which enables the printing is now explained.

FIGS. 14A to 14D show hand shake of data for the designation of the present time executed between the control unit and the print unit 1009. Numeral 1401 denotes a command sent from the control unit to the print unit. The command has a meaning that a command to be sent next indicates the predetermined time. Numeral 1402 denotes a status sent from the print unit to the control unit. The status has a meaning of a basic status of the print unit. Numeral 1403 denotes a command indicating the specific time. An MSB thereof is "0" and an LSB is an odd parity. As for intermediate six bits, bits 0–4 are code representing a time, and bit 5 indicates redefinition/extension of addition of the specific time by the time defined by the bits 0–4. When it is "0", it indicates the redefinition, and when it is "1", it indicates the extension of addition. The times corresponding to the codes of the bits 0–4 are shown in Table 1.

TABLE 1

| Code | Time (second) | Code | Time (second) |
|---|---|---|---|
| 0 | 0.5 | 16 | 60 |
| 1 | 1.0 | 17 | 80 |
| 2 | 1.5 | 18 | 100 |
| 3 | 2 | 19 | 120 |
| 4 | 3 | 20 | 150 |
| 5 | 4 | 21 | 180 |
| 6 | 5 | 22 | 210 |
| 7 | 6 | 23 | 240 |
| 8 | 8 | 24 | 270 |
| 9 | 10 | 25 | 300 |
| 10 | 15 | 26 | 360 |
| 11 | 20 | 27 | 420 |
| 12 | 25 | 28 | 480 |
| 13 | 30 | 29 | 540 |
| 14 | 40 | 30 | 600 |
| 15 | 50 | 31 | Infinite |

Numeral 1404 denotes a status of the print unit indicating the redefinition result or the extension of the addition of the specific time by the command 1403 received by the control unit. The content thereof is identical to that of the command 1403 except that the bit 5 is not significant.

Figure 15:
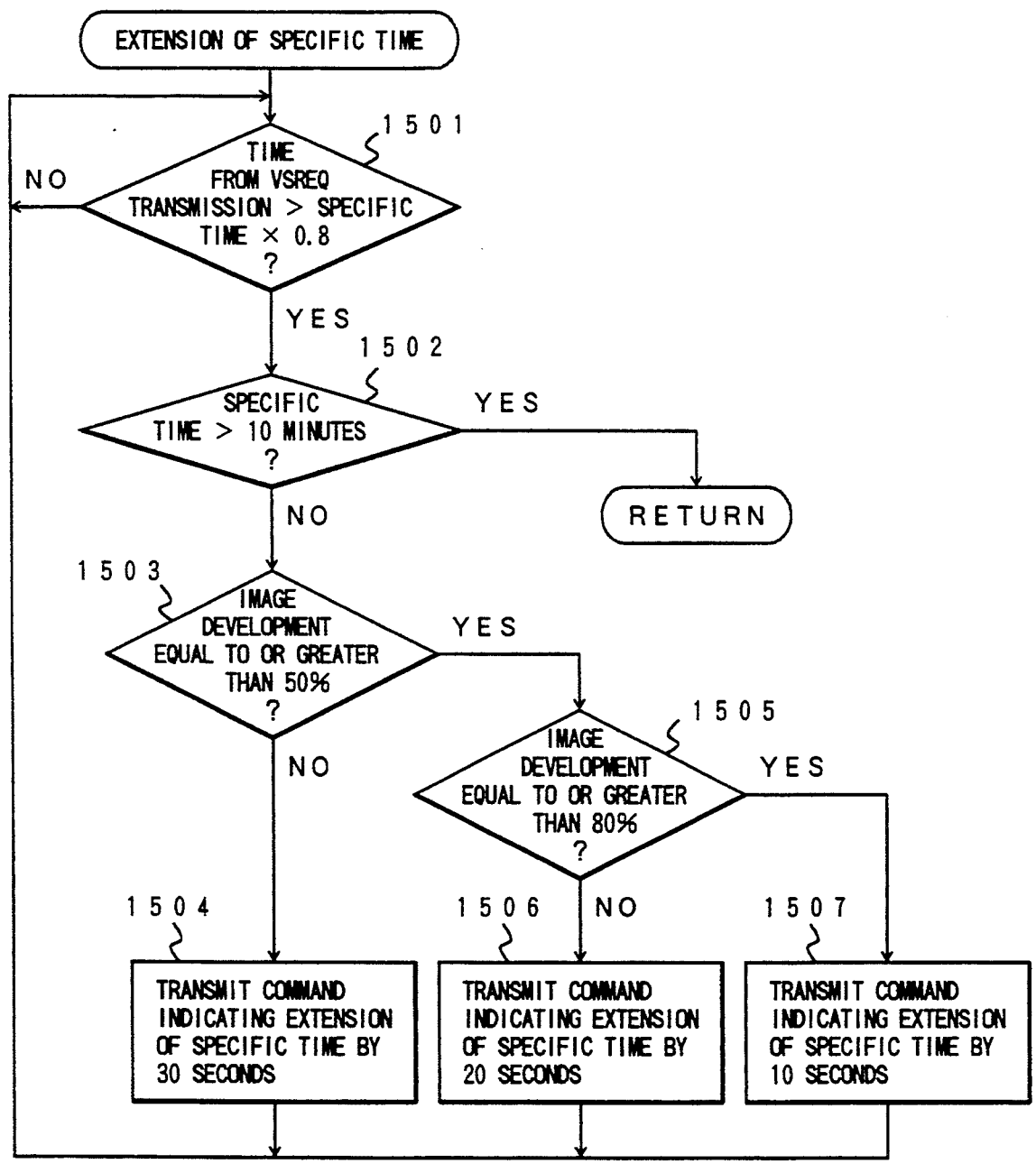
FIG. 15 shows a flow chart of a procedure for determining a predetermined time to await the VSYNC signal in the control mechanism of the fourth embodiment and commanding it to the printer.

The specific time sent from the control unit to the print unit is 0.5 second in its default value but the specific time in the image development process (S14) is determined as shown in FIG. 15. The time elapsed since the reception of the VSREQ signal from the print unit is compared with 80% of the current specific time (1501). If the elapsed time is longer, the current specific time is checked (1502). If it exceeds 10 minutes, no further process is conducted. If it is within 10 minutes, the process proceeds to the next step. The progress of the image development process is checked, and the extension of the specific time by 30 seconds, 20 seconds and 10 seconds are indicated to the print unit (1504, 1506 and 1507) when the progress is less than 50%, between 50% and less than 80%, and no less than 80%, respectively (1503 and 1505). The bit 5 of the command 1403 is now "1".

Figure 16:
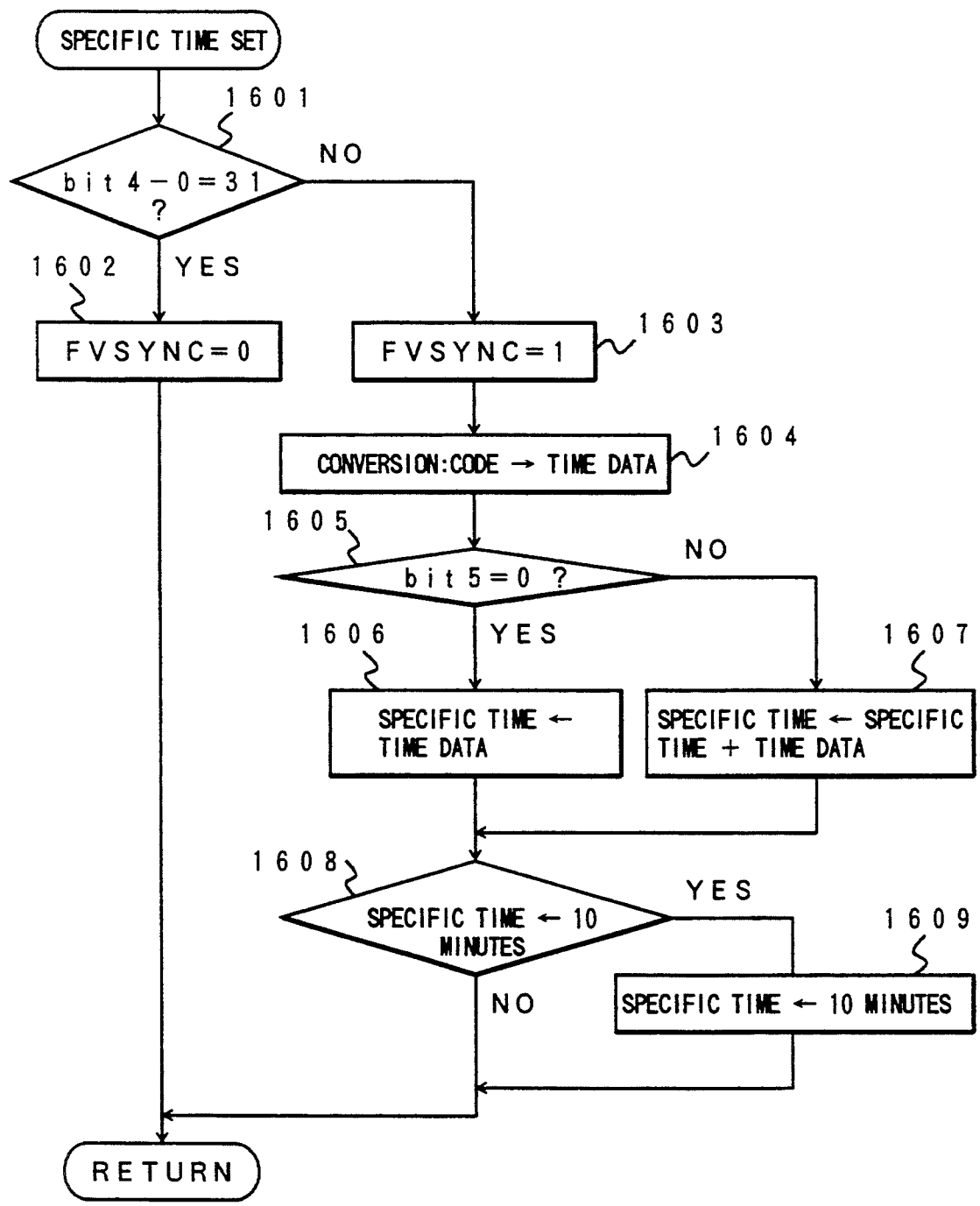
FIG. 16 shows a flow chart of a process after the reception of the predetermined time in the print mechanism of the fourth embodiment.

On the other hand, the print unit conducts the process shown in FIG. 16 and the FVSYNC of the Embodiment 1 and the specific time are determined. When the command 1403 is received, the code of the bits 0–4 is checked (1601) If the code is "31", the FVSYNC is set to "0" (1602). Namely, the VSYNC signal is infinitely monitored. If it is not "31", the FVSYNC is set to "1" (1603). Then, the code is converted to the time data in accordance with a rule of Table 1 (1604). Then, it is processed in accordance with the content of the bit 5 (1605). If it is "0", the preset time is updated by the time data (1606), and if it is "1", it is added to the current specific time (1607). In this case, the upper limit of the specific time is 10 minutes (600 seconds) (1608 and 1609).

In accordance with the present invention, the mode in which the VSYNC signal is permanently monitored and the mode in which it is monitored only for the specific time are selected by the mode switch. Thus, the present invention is compatible to the specific time from the issuance of the VSREQ signal to the reception of the VSYNC signal, used between the prior art image recording apparatus and the controller.

Further, since the image recording apparatus is aware of the mode currently set, a trouble due to mismatching of modes between the image recording apparatus and the controller is solved.

The present invention is not limited to the above embodiments but various modifications thereof may be made without departing from the scope of the claims.

What is claimed is:

1. An image recording apparatus operated in synchronism with a vertical synchronization signal from an external device, said apparatus comprising:
   means for sending out to said external device a signal indicating a status to accept the vertical synchronization signal; and
   switching means for switching between a plurality of operation modes related to an elapsed time from the send-out of the signal by said signal sending means, wherein when the vertical synchronization signal is not supplied and the elapsed time exceeds a predetermined time, the plurality of operation modes includes a mode in which a print enable status is released and a mode in which the print enable status is not released.

2. An image recording apparatus according to claim 1, wherein said switching means comprises a switch to switch the plurality of operation modes.

3. An image recording apparatus according to claim 1, wherein said switching means comprises a potentiometer for switching the plurality of operation modes.

4. An image recording apparatus according to claim 1, further comprising input means for inputting a command signal to command the switching by said switching means from said external device.

5. An image recording apparatus according to claim 1, further comprising informing means for informing the plurality of operation modes to said external device.

6. An image recording apparatus according to claim 1, wherein said switching means is capable of setting at least one elapsed time.

7. An image recording apparatus according to claim 1, further comprising said external device.

8. An image recording apparatus according to claim 7, wherein said external device comprises means for converting code data from a host computer into image data.

9. An image recording apparatus according to claim 8, wherein said external device comprises a plurality of interface means each interfacing the host computer.

10. An image recording apparatus operated in synchronism with a vertical synchronization signal from an external device, said apparatus comprising:
   means for sending out to said external device a signal indicating a status to accept the vertical synchronization signal;
   selection means for selecting one of a plurality of operation modes related to an elapsed time from the send-out of the signal by said signal sending means; and
   input means for receiving a command signal for commanding the selection of one of the plurality of operation modes, wherein when the vertical synchronization signal is not supplied and the elapsed time exceeds a predetermined time, the plurality of operation modes includes a mode in which a print enable status is released, and a mode in which the print enable status is not released.

11. An image recording apparatus according to claim 10, further comprising a switch for manually switching the plurality of operation modes.

12. An image recording apparatus according to claim 11, wherein said switch comprises a potentiometer for switching the plurality of operation modes.

13. An image recording apparatus according to claim 11, wherein said switch is capable of setting at least one elapsed time.

14. An image recording apparatus according to claim 10, further comprising informing means for informing the plurality of operation modes to said external device.

15. An image recording apparatus according to claim 10, further comprising said external device.

16. An image recording apparatus according to claim 15, wherein said external device comprises means for converting code data from a host computer into image data.

17. An image recording apparatus according to claim 16, wherein said external device comprises a plurality of interface means each interfacing the host computer.

18. An image recording apparatus operated in synchronism with a vertical synchronization signal from an external device, said apparatus comprising:
   means for sending out to said external device a signal indicating a status to accept the vertical synchronization signal;
   means for releasing a print enable status when the vertical synchronization signal is not supplied and a predetermined time has elapsed after said sending means sends the signal; and
   switching means for switching and setting the predetermined time on the basis of a command signal from said external device.

19. An image recording apparatus according to claim 18, wherein said switching means comprises a manual switch.

20. An image recording apparatus according to claim 18, wherein said switching means comprises a potentiometer.

21. An image recording apparatus according to claim 18, further comprising input means for inputting the command signal to command the switching by said switching means from said external device.

22. An image recording apparatus according to claim 21, further comprising said external device.

23. An image recording apparatus according to claim 22, wherein said external device comprises means for converting code data from a host computer into image data.

24. An image recording apparatus according to claim 23, wherein said external device comprises a plurality of interface means each interfacing the host computer.

25. An image recording apparatus according to claim 23, wherein said external device outputs said command signal in accordance-with a status of a switching operation.

* * * * *

UNITED STATES PATENT AND TRADEMARK OFFICE
CERTIFICATE OF CORRECTION

PATENT NO. : 5,398,100
DATED : March 14, 1995
INVENTOR(S) : MASANORI ISHIZU, ET AL.

It is certified that error appears in the above-indentified patent and that said Letters Patent is hereby corrected as shown below:

<u>COLUMN 1:</u>

Line 33, "with in" should read --within--.

<u>COLUMN 2:</u>

Line 34, "printer." should read --printer,--.

<u>COLUMN 3:</u>

Line 38, "timer" should read --time,--.

<u>COLUMN 5:</u>

Line 44, "1021" should read --1021,--.

<u>COLUMN 10:</u>

Line 40, "accordance-with" should read --accordance with--.

Signed and Sealed this

Sixth Day of June, 1995

Attest:

BRUCE LEHMAN

*Attesting Officer*      *Commissioner of Patents and Trademarks*